United States Patent [19]

Hill

[11] 3,902,586
[45] Sept. 2, 1975

[54] END ALIGNMENT APPARATUS
[75] Inventor: William J. Hill, Holden, Mass.
[73] Assignee: Morgan Construction Company, Worcester, Mass.
[22] Filed: Mar. 30, 1973
[21] Appl. No.: 346,460

[52] U.S. Cl. .................. 198/29; 198/283; 198/286
[51] Int. Cl. ............................................ B65g 47/22
[58] Field of Search ......... 198/29, 30, 33 R, 33 AB, 198/236, 246, 262, 267, 282–284, 286; 271/89, 221, 222; 294/67 BB, 81 R

[56] References Cited
UNITED STATES PATENTS

| | | | |
|---|---|---|---|
| 1,082,613 | 12/1913 | Spiess | 271/222 |
| 1,260,017 | 3/1918 | Novotny et al. | 271/221 |
| 2,275,688 | 3/1942 | Schulz | 271/89 |
| 2,735,713 | 2/1956 | Blakeley | 294/67 BB |
| 2,815,547 | 12/1957 | Hedderich | 294/67 BB |
| 3,002,779 | 10/1961 | Frate et al. | 294/67 BB |
| 3,102,627 | 9/1963 | Acton et al. | 198/29 |

Primary Examiner—Evon C. Blunk
Assistant Examiner—Joseph E. Valenza
Attorney, Agent, or Firm—Thompson, Birch, Gauthier & Samuels

[57] ABSTRACT

An apparatus for aligning the ends of elongated elements moving laterally along a given path. The apparatus includes a first alignment head on one side of the path, and an elongated draw bar extending transversally in relation to the path. A second alignment head is arranged in opposed relationship to the first alignment head and is adjustably positioned along the length of the draw bar to accommodate batches of elongated elements which have previously been cut to different lengths. A drive is connected to and operates to impart opposite reciprocal motion to both the first alignment head and the draw bar, thereby causing the first and second alignment heads to reciprocally move towards and away from each other to contact and align the ends of the laterally moving elongated elements.

5 Claims, 5 Drawing Figures

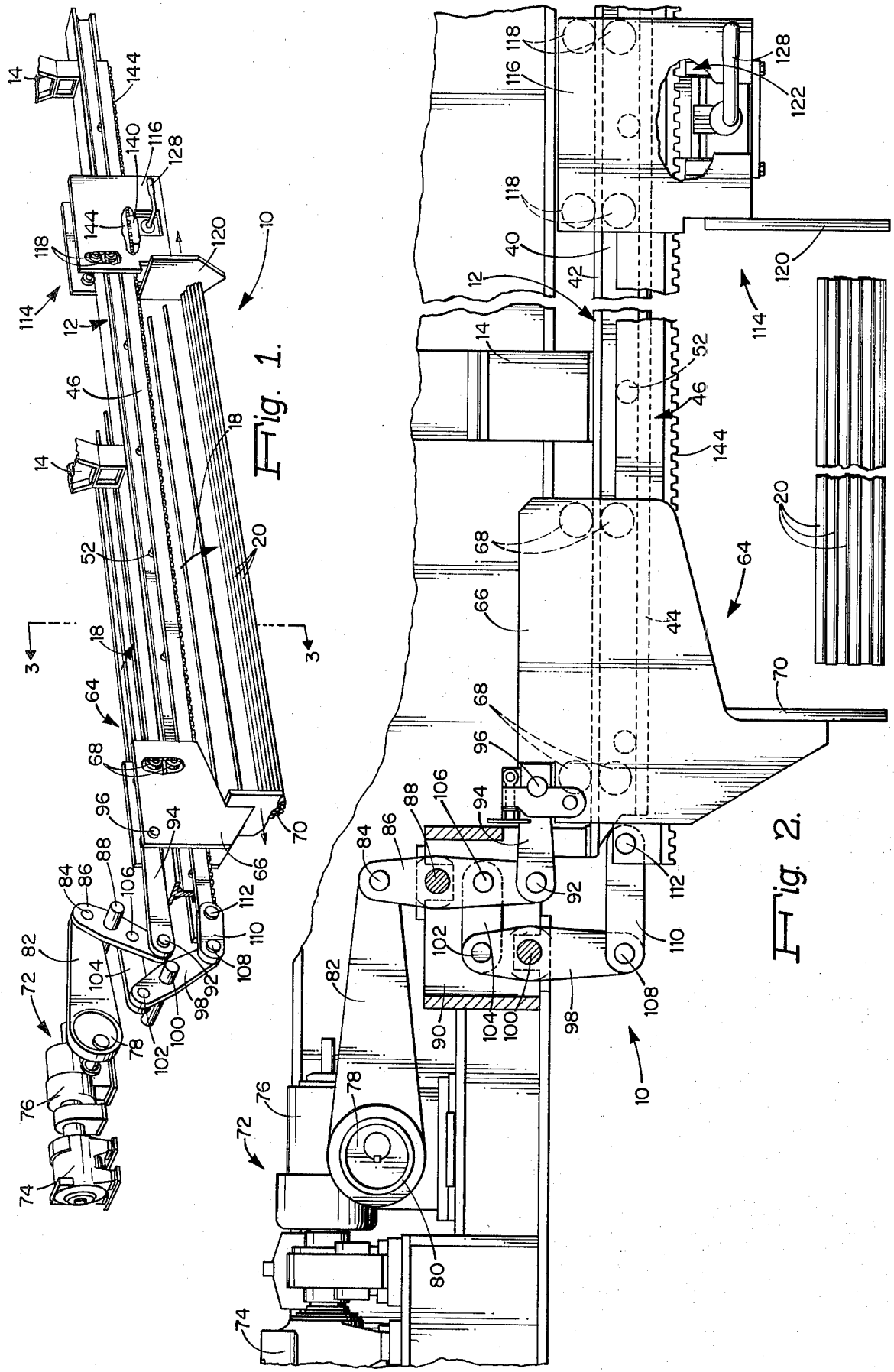

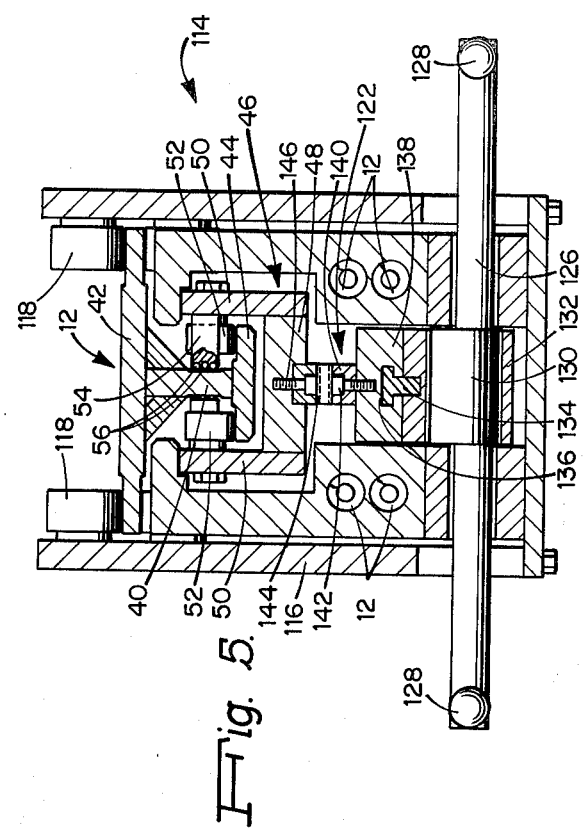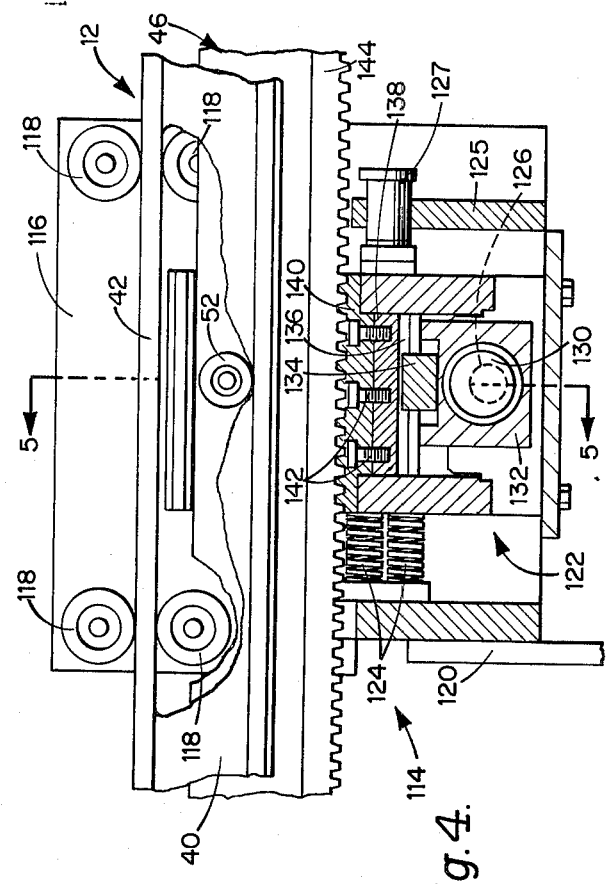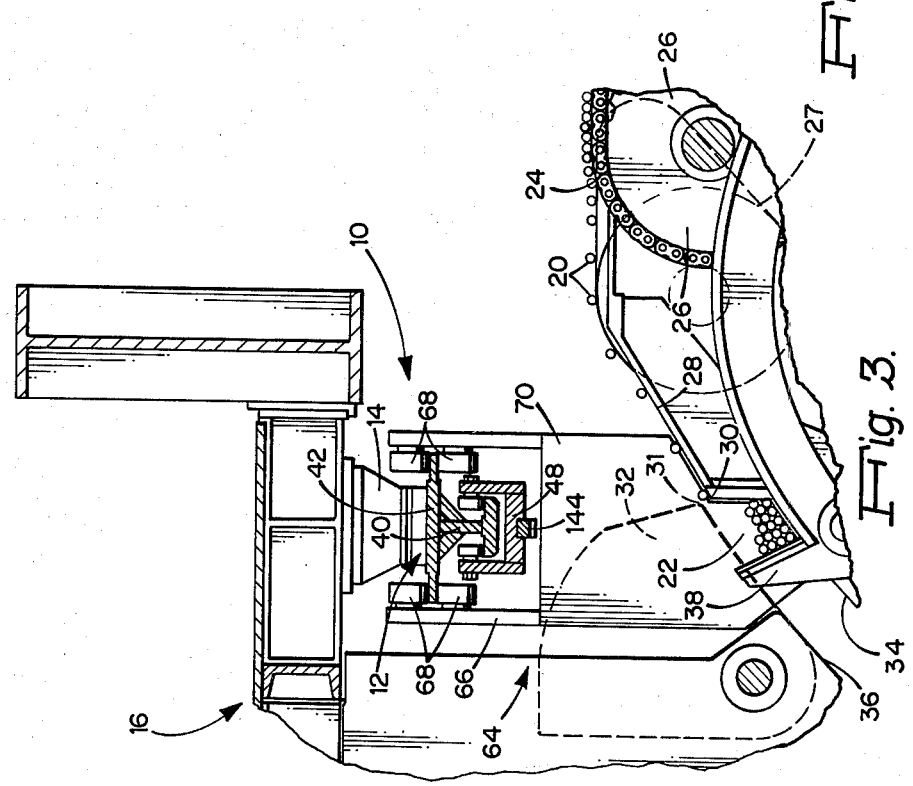

END ALIGNMENT APPARATUS

DESCRIPTION OF THE INVENTION

This invention relates generally to the art of material handling, and is concerned in particular with a novel and improved apparatus for aligning the ends of elongated elements.

The invention is particularly useful in, although not limited in application to, bar mills where the rolled product (for example, angles, flats, rounds, etc.) is subdivided into product lengths which are then assembled and strapped into tightly packed bundles. Where bundles of this type are being produced, it is important to avoid having axially misaligned elements, the ends of which protrude from the ends of the bundle. Such protruding ends spoil the appearance of the bundles, present a safety hazard, and are likely to be bent or distorted. Protruding ends complicate the orderly handling and storage of the bundles. Also, it is important to have the ends of the elements in a given bundle properly aligned in the event that the bundle is to be subsequently subdivided by a band sawing or otherwise.

It is, accordingly, an object of the present invention to provide an apparatus for obviating the problems outlined above by aligning the ends of elongated elements while they are moving laterally along a given path and prior to the point at which the elements are assembled and strapped into bundles.

Another object of the present invention is the provision of an end alignment apparatus for elongated elements which is adjustable in a rapid and efficient manner to accommodate changes in length of the elements being processed.

A still further object of the present invention is the provision of an end alignment apparatus which includes opposed reciprocally operating alignment heads on opposite sides of a path along which the elongated elements move laterally, the said heads being operated by a single drive means.

Another object of the present invention is the provision of an end alignment apparatus which has a rugged construction and which is capable of operating over prolonged periods of time without requiring repairs and with only minimal maintenance requirements. A still further object of the present invention is the provision of an end alignment apparatus which operates with a markedly reduced noise level.

These and other objects and advantages of the present invention will become more apparent as the description proceeds with the aid of the accompanying drawings wherein:

FIG. 1 is a perspective schematic view of an end alignment apparatus embodying the concepts of the present invention;

FIG. 2 is a foreshortened view in side elevation of the apparatus depicted schematically in FIG. 1;

FIG. 3 is a sectional view taken along lines 3—3 of FIG. 1 showing an end alignment apparatus in accordance with the present invention installed in a typical operating position;

FIG. 4 is a sectional view taken through the adjustably movable second alignment head; and, FIG. 5 is a sectional view taken along lines 5—5 of FIG. 4.

Referring now to the drawings wherein like numbers designate the same parts throughout the several views, and with initial reference to FIGS. 1 to 3, there is generally indicated at 10 an end alignment apparatus which embodies the concepts of the present invention.

The apparatus includes a support rail 12 fixed by means of suitably spaced brackets 14 to an overlying frame structure 16. The support rail overlies a path indicated schematically by the arrows 18 (see FIG. 1) along which elongated elements indicated typically at 20 move laterally towards a collecting zone 22.

The elements 20 (herein shown for illustrative purposes as comprising rounds) are moved laterally by any convenient means, such as for example driven conveyor chains 24 running over sprocket wheels 26. Truncated conical separating rolls 27 receive the elements 20 from the chains 24 and operate to accelerate the lateral movement thereof, with the result that a lateral spacing or separation is produced between each element. A downwardly sloping ramp 28 receives the elements 20 from the separating rolls 27 and carries them downwardly to a shoulder 30 which cooperates with an oppositely disposed shoulder 31 on an adjustable guide element 32 to form an inlet through which the elements are fed laterally into the collecting zone 22. The collecting zone is herein shown as being defined by opposed guide surfaces 34 and 36 which cooperate with a plurality of suitably spaced movable carrier members 38. The general arrangement of the conveyor chains 24, separating rolls 27, ramp 28, shoulders 30 and 31, adjustable guide element 32 and the elements making up the collecting zone 22 are also shown and claimed in another application Ser. No. 346,685 entitled "ASSEMBLY AND TRANSFER APPARATUS" filed concurrently herewith and assigned to the same assignee as that of the present application.

The support rail 12 has an intermediate web 40 joining a wide upper flange 42 and a narrower lower flanger 44. A draw bar 46 is supported by the rail 12 and is movable longitudinally in relation thereto. The draw bar has a generally U-shaped configuration with a lower web 48 joining two upstanding side webs 50. The side webs 50 carry guide wheels 52 at suitably spaced locations which run along the lower flange 44 of the rail 12. The side webs 50 further include inwardly extending ears 54 which carry bearings 56, the latter being in contact with the sides of the intermediate web 40 on the rail 12.

The first alignment head generally indicated at 64 is located on one side of the path 18. The alignment head 64 includes a carriage assembly 66 which is supported on and movable along the rail 12 by means of wheels 68 which engage the upper and lower surfaces of the upper rail flange 42. A face plate 70, the lower portion of which is suitably shaped to accommodate the downwardly sloping ramp 28 and the other structural elements making up the collecting zone 22, depends downwardly from the carriage assembly 66.

A drive means generally indicated at 72 is positioned near the first alignment head 64 on one side of the path 18. The drive means includes a motor 74 operating through a gear reducer and pinion gear assembly contained in housing 76 to drive a rotating eccentric 78. The eccentric is in turn journalled for rotation as at 80 at one end of a connecting link 82, the other end of which is pivotally connected as at 84 to the upper end of another link 86. The link 86 is mounted at its approximate mid-point for pivoted movement about a pin 88 carried on a fixed support 90. The link 86 is pivotally connected at its lower end as at 92 to another link 94, the latter in turn being connected as at 96 to the carriage assembly 66.

Another link 98 is mounted for pivotal movement about a second pin 100 which is also carried by the adjacent fixed support 90. The link 98 is pivotally connected at its upper end as at 102 to an intermediate link 104, which is in turn connected at its other end as at 106 to the lower leg of link 86. The bottom end of link 98 is pivotally connected as at 108 to another intermediate link 110 which is in turn connected at its opposite end as at 112 to the end of the draw bar 46.

In light of the foregoing, it will be understood that rotation of eccentric 78 will operate through connecting link 82 to cause the upper end of link 86 to reciprocate arcuately about pin 88. This motion will be transferred through link 94 to the carriage assembly 66, causing the latter to reciprocate (to the left and right as viewed in FIG. 2) on rail 12. At the same time, the motion of link 86 will also be transferred through links 104, 98, and 110 to the draw bar 46, causing the draw bar to reciprocate longitudinally in relation to the rail 12. This linkage arrangement will act as a reversing mechanism which will cause the carriage assembly 66 to move in one direction, for example to the right, while the draw bar 46 is being moved in the opposite direction, for example to the left.

A second alignment head 114 is located on the other side of the path 18 in opposed relationship to the first alignment head 64. With reference in particular to FIGS. 2, 4 and 5, it will be seen that the second alignment head 114 also includes a carriage assembly 116 having guide wheels 118 which engage and run along the upper and lower surfaces of the upper rail flange 42. A second face plate 120 depends from the carriage assembly 116. The face plate 120 provides a mirror image of face plate 70, and the two face plates are in opposed relationship on opposite sides of the path 18.

Before elements 20 of a given length are to be processed through the apparatus, the spacing between the face plates 70 and 120 of the two alignment heads 64 and 114 is adjusted. This is accomplished by manually moving the second alignment head 114 in relation to both the draw bar 46 and the support rail 12 towards or away from the first alignment head 64 until the proper spacing therebetween is achieved. Once this adjustment has been made, the second alignment head 114 is locked to the guide bar 46. To this end, the carriage assembly 116 houses a locking mechanism generally indicated at 122 which is resiliently connected at one end to the face plate 120 by springs 124 and slidably connected at the other end to a transverse plate 125 on the carriage assembly by pins 127. The locking mechanism includes a transverse shaft 126 having exterior handles 128 attached to its laterally protruding ends. The shaft 126 is provided at its midsection with an eccentric 130 which is journalled for rotation in a collar 132. The collar 132 carries a T-shaped key 134 which is slidably received in a groove 136 in the underside of a vertically movable member 138, the latter having a short upwardly facing rack 140 attached thereto by any convenient means such as for example machine screws 142. Another downwardly facing rack 144 extends along the underside of the draw bar 46 and is secured to the bottom web 48, again by any convenient means such as for example machine screws 146.

When the shaft 126 is adjusted by means of the handle 128 to the position shown in FIGS. 2 and 5, the eccentric 130 operates through collar 132, key 134 and vertically movable member 138 to raise the rack 140 into meshed engagement with the rack 144 on the underside of the draw bar 46, and this in turn fixes the position of the second alignment head 114 in relation to the draw bar. Once this has been accomplished, the apparatus is ready for operation. When the second alignment head 114 requires adjustment, the rack 140 is disengaged from rack 144 to free the alignment head for movement along both the support rail 12 and the draw bar 46.

As already explained, rotation of the main drive eccentric 78 operates through the previously described linkage arrangement to impart reciprocal motion in opposite directions to the first alignment head 64 and the draw bar 46. By locking the second alignment head 114 to the draw bar 46, the net effect is to reciprocate both alignment heads 64 and 114 in opposite directions, each being movably supported along with the draw bar on the support rail 12. As the elongated elements 20 pass between the reciprocating face plates 70 and 120, their ends are contacted and progressively pushed into lateral alignment, with most if not all of the aligning action taking place while the elements are moving down the ramp 28 and prior to the point at which they accumulate in zone 22. The cushioning effect provided by the springs 124 of the second alignment head 114 provides a measure of resilience between the two cooperating face plates 70 and 120.

In light of the foregoing description, the advantageous features of the present invention will now be evident to those skilled in the art. The ease with which the apparatus may be adjusted to handle elements of varying length is of prime importance. This is accomplished by simply disengaging the rack 140 on the second alignment head 114 from the rack 144 on the underside of the draw bar 46 and thereafter moving the second alignment head to the desired location. The economy afforded by the apparatus is also important. Both alignment heads 64 and 114 are operated by means of a single drive 72 operating in conjunction with a single draw bar 46. The primary movable elements, namely the two alignment heads 64 and 114 and the draw bar 46 are all supported and aligned on a single rugged guide rail 12, thereby facilitating both initial installation and subsequent maintenance. The "overhung" arrangement of the primary operating elements is also preferred in that it avoids their exposure to mill scale. However, it will be understood that the draw bar or draw bars, as the case may be, may also be located beneath the path of element travel where structural considerations require this arrangement.

It is my invention to cover all changes to and modifications of the embodiment herein chosen for purposes of disclosure which do not depart from the spirit and scope of the invention.

I claim:

1. Apparatus for aligning the ends of elongated elements moving laterally along a given path on a conveyer means, said apparatus comprising: fixed longitudinal support means vertically spaced from and extending in a direction transverse to said conveyor means; a cooperating pair of end contacting means mounted on said support means for reciprocal movement along the length thereof, one of said end contacting means being located on one side of said path and the other of said end contacting means being located on the opposite side of said path; intermediate means extending longitudinally from one side to the opposite side of said conveyor means, said intermediate means being carried by said support means and being movable axially thereon in opposite directions transverse to said path; locking means for fixing one of said end contacting means relative to said intermediate means at a selected position along the length thereof; and a single drive means located on the said opposite side of said path, said drive means being connected to both said other end contacting means and said intermediate means and being operable to impart reciprocal motion in opposite directions thereto, thereby causing said end contacting means to reciprocate towards and away from each other to contact and align the ends of elongated elements moving laterally therebetween along said path.

2. The apparatus as claimed in claim 1 wherein said drive means includes rotatable eccentric means, and link means connecting said eccentric means to said other end contacting means and said intermediate means.

3. The apparatus as claimed in claim 1 further characterized by said locking means comprising a first rack extending along at least a portion of said intermediate means, a second rack on said one end contacting means, and adjustment means for moving said second rack into and out of engagement with said first rack.

4. The apparatus as claimed in claim 3 wherein said adjustment means includes rotatable eccentric means carried by said one end contacting means.

5. Apparatus for aligning the ends of elongated elements moving laterally along a given path on a conveyor means, said apparatus comprising: a fixed elongated support rail spaced vertically from and extending transversally across said conveyor means; first and second end contacting means movably mounted on said support rail on opposite sides of said path; a longitudinally extending draw bar carried on said support rail for axial movement in relation thereto; locking means for fixing said second end contacting means to said draw bar at a selected position along the length thereof, said locking means including a first rack extending along at least a portion of said draw bar, a second rack on said second end contacting means, and adjustment means for moving said second rack into and out of engagement with said first rack; and a single drive means located on one side of said conveyor means and operatively connected to both said first end contacting means and said draw bar for reciprocally moving said first end contacting means and said draw bar in opposite directions, thereby causing said first and second end contacting means to reciprocate towards and away from each other to contact and align the ends of elongated elements moving laterally therebetween along said path.

* * * * *